(12) United States Patent
Shono et al.

(10) Patent No.: US 11,549,077 B2
(45) Date of Patent: Jan. 10, 2023

(54) REFRIGERATOR OIL AND HYDRAULIC FLUID COMPOSITION FOR REFRIGERATORS

(71) Applicant: ENEOS Corporation, Tokyo (JP)

(72) Inventors: Yohei Shono, Tokyo (JP); Fumiyuki Nara, Tokyo (JP); Takeshi Okido, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/967,250

(22) PCT Filed: Feb. 6, 2019

(86) PCT No.: PCT/JP2019/004265
§ 371 (c)(1),
(2) Date: Aug. 4, 2020

(87) PCT Pub. No.: WO2019/156126
PCT Pub. Date: Aug. 15, 2019

(65) Prior Publication Data
US 2020/0354645 A1    Nov. 12, 2020

(30) Foreign Application Priority Data

Feb. 7, 2018    (JP) .............................. JP2018-019949

(51) Int. Cl.
*C10M 137/04* (2006.01)
*C10M 137/10* (2006.01)
(Continued)

(52) U.S. Cl.
CPC .......... *C10M 137/105* (2013.01); *C09K 5/041* (2013.01); *C10M 137/04* (2013.01);
(Continued)

(58) Field of Classification Search
CPC ... C09K 5/041; C10M 137/04; C10M 169/04; C10M 2203/003; C10M 2223/047;
(Continued)

(56) References Cited

U.S. PATENT DOCUMENTS

| 4,946,608 A | 8/1990 | Segaud |
| 2002/0193262 A1* | 12/2002 | Kaimai ................ C10M 105/38 |
| | | 508/485 |

(Continued)

FOREIGN PATENT DOCUMENTS

| CN | 101568626 | 10/2009 |
| CN | 102844417 | 12/2012 |

(Continued)

OTHER PUBLICATIONS

ISR issued in WIPO Patent Application No. PCT/JP2019/004265, dated Mar. 26, 2019, English translation.

(Continued)

*Primary Examiner* — Prem C Singh
*Assistant Examiner* — Francis C Campanell
(74) *Attorney, Agent, or Firm* — Greenblum & Bernstein P.L.C.

(57) ABSTRACT

A refrigerating machine oil containing: a lubricating base oil; and a compound represented by the following formula (1):

$$R^1O\underset{R^2O}{\overset{S}{\underset{\|}{P}}}-S-R^3-\underset{\|}{\overset{}{C}}-OR^4 \quad (1)$$
$$\phantom{R^1O\underset{R^2O}{\overset{S}{\underset{\|}{P}}}-S-R^3-}O$$

(Continued)

wherein $R^1$ and $R^2$ each independently represent a monovalent hydrocarbon group, $R^3$ represents a divalent hydrocarbon group, and $R^4$ represents hydrogen atom or a monovalent hydrocarbon group, and the refrigerating machine oil having a kinematic viscosity at 100° C. of 0.5 mm²/s or more and 2.5 mm²/s or less.

12 Claims, 1 Drawing Sheet

(51) Int. Cl.
    *C09K 5/04* (2006.01)
    *C10M 169/04* (2006.01)
    *F25B 31/00* (2006.01)
    *C10N 30/00* (2006.01)
    *C10N 30/02* (2006.01)
    *C10N 30/06* (2006.01)
    *C10N 40/30* (2006.01)

(52) U.S. Cl.
    CPC .......... *C10M 169/04* (2013.01); *F25B 31/002* (2013.01); *C10M 2203/003* (2013.01); *C10M 2223/041* (2013.01); *C10M 2223/047* (2013.01); *C10N 2030/02* (2013.01); *C10N 2030/06* (2013.01); *C10N 2030/43* (2020.05); *C10N 2040/30* (2013.01)

(58) Field of Classification Search
    CPC ............ C10M 171/008; C10M 137/10; F25B 31/002; F25B 2500/16; F25B 1/00; C10N 2030/02; C10N 2030/06; C10N 2040/30; C10N 2020/103; C10N 2020/02
    USPC ............................................ 252/68; 508/359
    See application file for complete search history.

(56) References Cited

U.S. PATENT DOCUMENTS

| | | | |
|---|---|---|---|
| 2010/0105590 A1* | 4/2010 | Nagakari | ............ C10M 141/00 |
| | | | 508/508 |
| 2017/0327763 A1 | 11/2017 | Takahashi et al. | |
| 2017/0335232 A1* | 11/2017 | Kaneko | ................ C08F 116/14 |
| 2018/0282649 A1 | 10/2018 | Kaneko | |

FOREIGN PATENT DOCUMENTS

| | | |
|---|---|---|
| CN | 104119998 | 10/2014 |
| CN | 107001967 | 8/2017 |
| JP | S62-059695 | 3/1987 |
| JP | H05-070785 A | 3/1993 |
| JP | H6-009978 A | 1/1994 |
| JP | H8-259978 | 10/1996 |
| JP | 2001-139972 | 5/2001 |
| JP | 2005-146010 A | 6/2005 |
| JP | 2008-214618 | 9/2008 |
| JP | 2009-235179 | 10/2009 |
| JP | 2009-235226 A | 10/2009 |
| JP | 2017-071690 | 4/2017 |
| JP | 2018-095792 A | 6/2018 |
| WO | 2006/062245 A1 | 6/2006 |
| WO | 2016/072296 A1 | 5/2016 |
| WO | 2017/061601 | 4/2017 |

OTHER PUBLICATIONS

IPRP issued in WIPO Patent Application No. PCT/JP2019/004265, mailed Aug. 20, 2020, English translation.
ISR issued in WIPO Patent Application No. PCT/JP2019/004261, Apr. 2, 2019, English translation.
IPRP issued in WIPO Patent Application No. PCT/JP2019/004261, mailed Aug. 20, 2020, English translation.
Office Action issued in U.S. Appl. No. 16/967,242, dated Jul. 9, 2021.

* cited by examiner

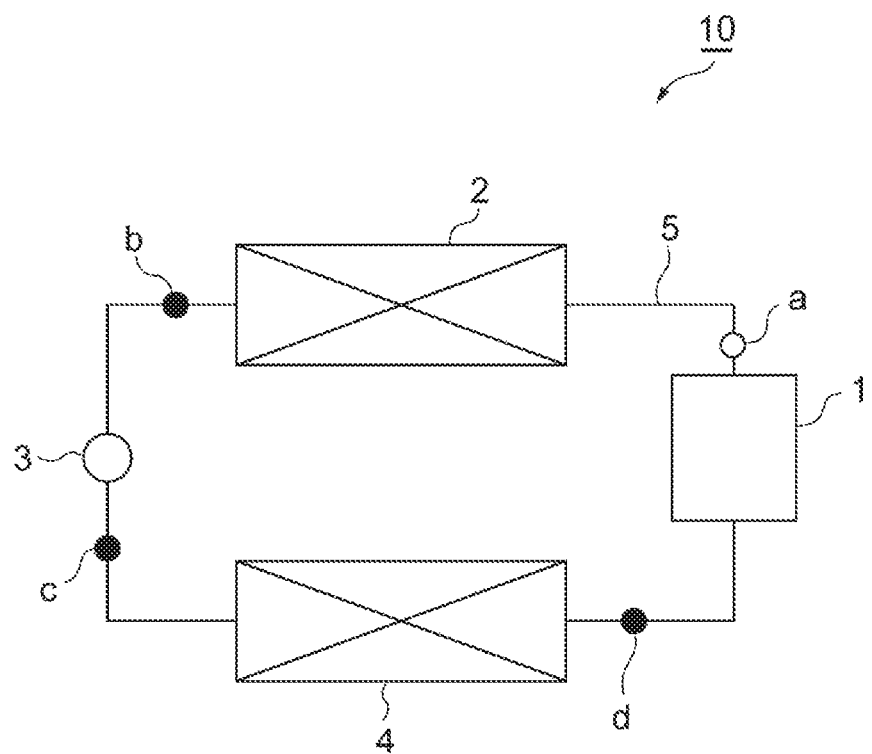

REFRIGERATOR OIL AND HYDRAULIC FLUID COMPOSITION FOR REFRIGERATORS

TECHNICAL FIELD

The present invention relates to a refrigerating machine oil and a working fluid composition for a refrigerating machine.

BACKGROUND ART

A refrigerating machine such as a refrigerator or an air conditioner includes a compressor for circulating a refrigerant in a refrigerant circulation system. The compressor is filled with refrigerating machine oil for lubricating the sliding members. In general, the lower the viscosity of the refrigerating machine oil is, the more stirring resistance and friction of the sliding portion can be reduced. Therefore, the reduction of the viscosity of the refrigerating machine oil leads to energy saving of the refrigerating machine, Patent Document 1 discloses, for example, a refrigerating machine oil having VG3 or more and VG8 or less.

CITATION LIST

Patent Literature

[Patent Document 1] WO 2006/062245

SUMMARY OF INVENTION

Technical Problem

However, when the viscosity of the refrigeration oil is low, it is difficult to hold the oil film on the sliding portion, and thus there is a concern that the antiwear property cannot be maintained. In addition, since the refrigerating machine oil is compatible with the refrigerant in the refrigerating machine, the viscosity at the time of use is greatly reduced as compared with that of the refrigerating machine oil itself, and the lubrication condition changes from the fluid lubrication region to the mixed lubrication region or the boundary lubrication region, so that the frequency of contact between the sliding members increases. Therefore, the use of an ultra-low viscosity refrigerating machine oil having a kinematic viscosity at 100° C. of 2.5 mm$^2$/s or less or 2.0 mm$^2$/s or less has not been sufficiently studied so far. In particular, it is extremely difficult to obtain a refrigerating machine oil having high antiwear property even under severe lubrication conditions such as mixed lubrication or boundary lubrication conditions while using such an ultra-low viscosity refrigerating machine oil.

The present invention has been made in view of such circumstances, and an object of the present invention is to provide a refrigerating machine oil having excellent antiwear property even under severe lubrication conditions such as mixed lubrication or boundary lubrication conditions while having low viscosity, and a working fluid composition for a refrigerating machine containing the refrigerating machine oil.

Solution to Problem

The present invention provides a refrigerating machine oil comprising: a lubricating base oil; and a compound represented by the following formula (1), and the refrigerating machine oil having a kinematic viscosity at 100° C. of 0.5 mm$^2$/s or more and 2.5 mm$^2$/s or less.

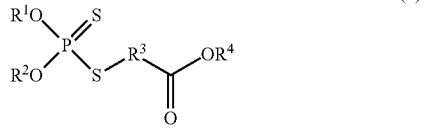

(1)

In the formula (1), $R^1$ and $R^2$ each independently represent a monovalent hydrocarbon group, $R^3$ represents a divalent hydrocarbon group, and $R^4$ represents hydrogen atom or a monovalent hydrocarbon group.

The refrigerating machine oil may further contain a phosphorus-based extreme pressure agent other than the above compounds.

The 90% distillation temperature of the refrigerating machine oil by gas chromatography distillation is preferably 250° C. or more and 400° C. or less.

The 95% distillation temperature of the refrigerating machine oil by gas chromatography distillation is preferably 270° C. or more and 410° C. or less.

The difference between the 90% distillation temperature and the 5% distillation temperature by gas chromatography distillation of the refrigerating machine oil is preferably 40° C. or more and 200° C. or less.

The refrigerating machine oil preferably has a % $C_A$ by n-d-M ring analysis of 5 or less.

The sulfur content of the lubricating base oil is preferably 0.001% by mass or more and 0.2% by mass or less.

The present invention also provides a working fluid composition for a refrigerating machine comprising the above-described refrigerating machine oil of the present invention and a refrigerant.

Advantageous Effects of Invention

According to the present invention, it is possible to provide a refrigerating machine oil having high antiwear property even under severe lubrication conditions such as mixed lubrication or boundary lubrication conditions while having low viscosity, and a working fluid composition for a refrigerator containing the refrigerating machine oil.

BRIEF DESCRIPTION OF DRAWINGS

FIG. 1 is a schematic diagram showing an example of the configuration of a refrigerating machine.

DESCRIPTION OF EMBODIMENTS

Hereinafter, embodiments of the present invention will be described in detail.

The refrigerating machine oil according to the present embodiment contains a lubricating base oil and a compound represented by the following general formula (1),

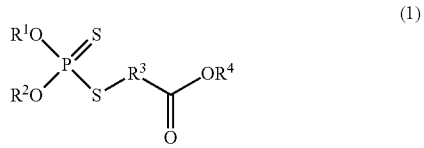

(1)

In the formula (1), $R^1$ and $R^2$ each independently represent a monovalent hydrocarbon group, Examples of the divalent hydrocarbon group include an alkyl group and an aryl group. The number of carbon atoms of the divalent hydrocarbon group represented by $R^1$ and $R^2$ each independently may be 1 or more, 2 or more, or 3 or more, and may be 10 or less, 9 or less, or 8 or less. The total number of carbon atoms of the divalent hydrocarbon group represented by and $R^2$ may be 2 or more, 3 or more, or 4 or more, and may be 20 or less, 19 or less, or 18 or less.

In the formula (1), $R^3$ represents a divalent hydrocarbon group. Examples of the divalent hydrocarbon group include an alkylene group. The number of carbon atoms of the divalent hydrocarbon group represented by $R^3$ may be 1 or more, 2 or more, or 3 or more, and may be 10 or less, 9 or less, or 8 or less.

In the formula (1), $R^4$ represents hydrogen atom or a monovalent hydrocarbon group. Examples of the monovalent hydrocarbon group include an alkyl group. The number of carbon atoms of the monovalent hydrocarbon group represented by $R^4$ may be 1 or more, 2 or more, or 3 or more, and may be 10 or less, 9 or less, or 8 or less.

Preferable examples of the compound represented by the formula (1) include a compound represented by the following formula (A).

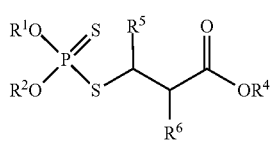

(A)

In the formula, $R^1$, $R^2$ and $R^4$ have the same meanings as $R^1$, $R^2$ and $R^4$ in the formula (1).

$R^5$ and $R^6$ each independently represent hydrogen atom or an alkyl group. The alkyl group may be linear or branched, and is preferably linear. The number of carbon atoms of the alkyl group may be, for example, 1 to 4 1 to 3, or 1 to 2. At least one of $R^5$ and $R^6$ is preferably hydrogen atom. More preferably, one of $R^5$ and $R^6$ is an alkyl group and the other is hydrogen atom. Specific examples of such compounds include 3-(diisobutoxy-thiophosphorylsulfanyl)-2-methyl-propionic acid, ethyl-3-[[bis(1-methylethoxy)phosphinothioyl]thio] propionate, 3-(O,O-diisopropyl-dithiophosphoryl)-propionic acid, 3-(O,O-diisopropyl-dithiophosphoryl)-2-methyl-propionic acid, 3-(O,O-diisobutyl-dithiophosphoryl)-propionic acid, 3-(O,O-diisobutyl-dithiophosphoryl)-2-methyl-propionic acid, and alkyl esters such as ethyl esters of these compounds.

The content of the compound represented by the formula (1) is preferably 0.001% by mass or more, more preferably 0.005% by mass or more, and still more preferably 0.01% by mass or more, based on the total amount of the refrigerating machine oil, from the viewpoint of improving lubricity. The content of the compound represented by the formula (1) is preferably 5% by mass or less, more preferably 4% by mass or less, and still more preferably 3% by mass or less, based on the total amount of the refrigerating machine oil, from the viewpoint of improving stability. The content of the compound represented by the formula (1) is preferably 0.001 to 5% by mass, 0.001 to 4% by mass, 0.001 to 3% by mass, 0.005 to 5% by mass, 0.005 to 0.4% by mass, 0.005 to 3% by mass, 0.01 to 5% by mass, 0.01 to 4% by mass, or 0.01 to 3% by mass, from the viewpoint of improving both lubricity and stability. The content of the compound represented by the formula (1) may be 1% by mass or less, 0.1% by mass or less, 0.06% by mass or less, or 0.04% by mass or less, from the viewpoint of obtaining a refrigerating machine oil having excellent stability by suppressing initial oxidation to a low level, and further enhancing the combined effect of a phosphorus-based extreme pressure agent other than the compound represented by the formula 1), which is described below.

Examples of the lubricating base oil include mineral oils. The mineral oil can be obtained by purifying a lubricating oil fraction obtained by atmospheric distillation and vacuum distillation of a paraffinic or naphthenic crude oil by a method such as solvent deasphalting, solvent refining, hydrorefining, hydrocracking, solvent dewaxing, hydrodewaxing, clay treatment or sulfuric acid washing. These purification methods may be used singly or in combination of two or more. As the lubricating base oil, from the viewpoint of availability, it is preferable to appropriately select a low-viscosity lubricating base oil generally used for applications such as solvents, diluents, and metalworking fluids.

The lubricating base oil may consist of the above-mentioned mineral oil, and usually, the proportion of the mineral oil may be 50% by mass or more, 70% by mass or more, or 90% by mass or more, based on the total amount of the lubricating base oil. As long as the effects of the present invention are not significantly impaired, hydrocarbon oils such as alkylbenzenes or oxygen-containing oils such as esters may be further contained instead of the mineral oil.

The alkyl benzene may be at least one selected from the group consisting of the following alkyl benzene (a1) and alkyl benzene (a2).

Alkylbenzene (a1): an alkylbenzene having 1 to 4 alkyl groups having 1 to 19 carbon atoms and having a total carbon atoms of the alkyl groups of 1 to 19 (preferably an alkylbenzene having 1 to 4 alkyl groups having 1 to 15 carbon atoms and having a total carbon atoms of the alkyl groups of 9 to 15)

Alkylbenzene (a2): an alkylbenzene having 1 to 4 alkyl groups having 1 to 40 carbon atoms and having a total carbon atoms of the alkyl groups of 20 to 40 (preferably an alkylbenzene having 1 to 4 alkyl groups having 1 to 30 carbon atoms and having a total carbon atoms of the alkyl groups of 20 to 30)

The ester may be, for example, an ester of a monohydric or dihydric alcohol and a fatty acid. The monohydric alcohol or dihydric alcohol may be, for example, an aliphatic alcohol having 4 to 12 carbon atoms. The fatty acid may be, for example, a fatty acid having 0.4 to 19 carbon atoms.

The lubricating base oil may have a kinematic viscosity at 40° C. of, for example, 2.0 mm$^2$/s or more, 2.5 mm$^2$/s or more, or 2.7 mm$^2$/s or more, and, for example, 4.5 mm$^2$/s or less, 4.0 mm$^2$/s or less, or 3.5 mm$^2$/s or less. The lubricating base oil may have a kinematic viscosity at 100° C. of, for example, 0.5 mm$^2$/s or more, 0.6 mm$^2$/s or more, 0.8 mm$^2$/s or more, or 1.0 mm$^2$/s or more, and, for example, 2.5 mm$^2$/s or less, 2.0 mm$^2$/s or less, 1.5 mm$^2$/s or less, or 1.3 mm$^2$/s or less.

The sulfur content of the lubricating base oil may be, for example, 0.05% by mass or less, 0.02% by mass or less, or 0.01% by mass or less, or even less than 0.02% by mass. The sulfur content of the lubricating base oil may be less than 0.0001% by mass, but when a phosphorus-based extreme pressure agent (e.g., first and/or second extreme pressure agent) other than the compound represented by the formula (1) described below is used in combination, the sulfur content may be, for example, 0.0001% by mass or more, 0.0005% by mass or more, or 0.001% by mass or more, from the viewpoint of further enhancing the synergistic effect.

The content of the lubricating base oil may be, for example, 50% by mass or more, 60% by mass or more, 70% by mass or more, 80% by mass or more, 90% by mass or more, or 95% by mass or more, and may be, for example, 99.5% by mass or less, 99% by mass or less, or 98.5% by mass or less, based on the total amount of the refrigerating machine oil.

The refrigerating machine oil according to the present embodiment may further contain a phosphorus-based extreme pressure agent other than the compound represented by the formula (1). The phosphorus-based extreme pressure agent may contain phosphorus in the molecule. The phosphorus-based extreme pressure agent can be classified into, for example, an extreme pressure agent containing sulfur and phosphorus (first extreme pressure agent) and an extreme pressure agent not containing sulfur but containing phosphorus (second extreme pressure agent). Preferable examples of the first extreme pressure agent include thiophosphoric esters. Preferable examples of the second extreme pressure agent include phosphoric esters, acidic phosphoric esters, amine salts of acidic phosphoric esters, chlorinated phosphoric esters, and phosphorous esters, which are sulfur-free.

Examples of the thiophosphoric ester include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate and xylenyldiphenyl phosphorothionate, Among them, triphenyl phosphorothionate is preferable.

Examples of the phosphoric esters include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritenadecyl phosphate, tripentadecyl phosphate, trihexadecyl phosphate, triheptadecyl phosphate, trioctadecyl phosphate, trioleyl phosphate, triphenyl phosphate, tricresyl phosphate, tri-(ethyl phenyl) phosphate, tri-(propylphenyl) phosphate, tri-(butylphenyl) phosphate, trixylenyl phosphate, cresyldiphenyl phosphate, and xylenyldiphenyl phosphate. Among them, triphenyl phosphate and tricresyl phosphate are preferable.

Examples of the acidic phosphoric esters include monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate and dioleyl acid phosphate.

Examples of the amine salts of acidic phosphoric esters include salts of the above-described acidic phosphoric esters with amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethyl amine, tripropylamine, tributylamine, tripentylamine, trihexyl amine, triheptylamine and trioctylamine.

Examples of the chlorinated, phosphoric esters include tris-(dichloropropyl) phosphate, tris-(chloroethyl) phosphate, tris-(chlorophenyl) phosphate and polyoxyalkylene-bis-[di(chloroalkyl)] phosphate. Examples of the phosphorous esters include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite.

The content of the phosphorus-based extreme pressure agent may be, for example, 0.1% by mass or more, 1% by mass or more, 1.5% by mass or more, or 1.6% by mass or more, and may be, for example, 5% by mass or less, 3% by mass or less, 2.5% by mass or less, or 2% by mass or less, based on the total amount of the refrigerating machine oil, from the viewpoint of further excellent antiwear property.

When the first extreme pressure agent and the second extreme pressure agent are used in combination as the extreme pressure agent, the content of the first extreme pressure agent based on the total amount of the first extreme pressure agent and the second extreme pressure agent may be, for example, 5% by mass or more, 8% by mass or more, or 10% by mass or more, and may be, for example, 20% by mass or less, 18% by mass or less, 15% by mass or less, or 14% by mass or less.

The content of the first extreme pressure agent may be, for example, 0.01% by mass or more, 0.05% by mass or more, or 0.1% by mass or more, and may be, for example, 1% by mass or less, 0.5% by mass or less, or 0.4% by mass or less, based on the total amount of the refrigerating machine oil, from the viewpoint of further excellent antiwear property. The content of the second extreme pressure agent may be, for example, 0.5% by mass or more, 1% by mass or more, or 1.2% by mass or more, and may be, for example, 5% by mass or less, 3% by mass or less, 2.0% by mass or less, or 1.8% by mass or less, based on the total amount of the refrigerating machine oil, from the viewpoint of further excellent antiwear property.

When the phosphorus-based extreme pressure agent is further contained, the ratio (mass ratio) between the content thereof and the content of the compound represented by the formula (1) is not particularly limited, but the content of the compound represented by the formula (1) may be 0.1 parts by mass or more, 0.2 parts by mass or more, or 0.5 parts by mass or more, and may be 100 parts by mass or less, 50 parts by mass or less, 10 parts by mass or less, 5 parts by mass or less, or 1 parts by mass or less, based on 100 parts by mass of the phosphorus-based extreme pressure agent.

The kinematic viscosity at 100° C. of the refrigerating machine oil according to the present embodiment is 0.5 mm$^2$/s or more and 2.5 mm$^2$/s or less. When the kinematic viscosity at 100° C. of the refrigerating machine oil is less than 0.5 mm²/s, not only the lubricity is insufficient, but also the flash point tends to decrease, and when the kinematic viscosity is more than 2.5 mm²/s, it is not possible to obtain a refrigerating machine oil having a low viscosity, which is the object of the present invention. The kinematic viscosity at 100° C. of the refrigerating machine oil is preferably 0.6 mm²/s or more and 2.0 mm²/s or less, more preferably 0.8 mm²/s or more and 1.5 mm²/s or less, and still more preferably 1.0 mm²/s or more and 1.4 mm²/s or less, from the viewpoint of further excellent balance between antiwear property and energy saving of the refrigerating machine. The kinematic viscosity in the present invention means a kinematic viscosity measured in accordance with JIS K 2283: 2000.

The kinematic viscosity at 40° C. of the refrigerating machine oil may be, for example, 2.0 mm²/s or more, 2.5 mm²/s or more, 3.0 mm²/s or more, or 3.2 mm²/s or more, and may be, for example, 6.0 mm²/s or less, 5.0 mm²/s or less, 4.5 mm²/s or less, 4.0 mm²/s or less, or 3.5 mm²/s or less.

The ISO viscosity classification of the refrigerating machine oil is not particularly limited as long as the kinematic viscosity at 100° C. of the refrigerating machine oil is 0.5 mm²/s or more and 2.5 mm²/s or less. The ISO viscosity classification of the refrigerating machine oil is classified into, for example, VG2, VG3, VG5, or VG7. From the viewpoint of securing low friction properties in the fluid lubrication region, the ISO viscosity classification is preferably VG7 or less, more preferably VG5 or less, and still more preferably VG3 or less. For example, in the case of a refrigerating machine oil of VG3, although the friction coefficient in the fluid lubrication region is generally lower than that of a refrigerating machine oil of a higher viscosity grade, the lubricity in the mixed lubrication or boundary lubrication region tends to deteriorate and the friction coefficient tends to increase. However, by adding the compound represented by the formula (1) in the present invention, the lubricity in the mixed lubrication region or the boundary lubrication region is remarkably improved, thereby contributing to the low friction property. This improvement degree is higher in the refrigerating machine oil of VG3. The ISO viscosity classification as used herein means a viscosity grade defined in MS K 2001 (1993) "Industrial Lubricant-ISO Viscosity Classification" or ISO 3448•1992 "Industrial Liquid Lubricant-ISO Viscosity Classification".

The aniline point of the refrigerating machine oil may be, for example, 60° C. or higher, 70° C. or higher, 73° C. or higher, 76° C. or higher, or 80° C., or higher, from the viewpoint of further excellent antiwear property. The aniline point of the refrigerating machine oil may be, for example, 100° C. or lower, 95° C. or lower, or 90° C. or lower, from the viewpoint of compatibility with an organic material such as a PET (polyethylene terephthalate) material or a sealing material used in a refrigeration apparatus (refrigerating machine) The aniline point in the present invention means a value measured in accordance with JIS K 2256:2013.

In the distillation properties by gas chromatography distillation (hereinafter also referred to as GC distillation) of the refrigerating machine oil (hereinafter "distillation properties" means distillation properties by GC distillation unless otherwise specified), from the viewpoint of lubricity, the distillation end point EP may be 300° C. or higher, 350° C. or higher, 380° C. or higher, 390° C. or higher, 395° C. or higher, or 400° C. or higher. The distillation end point EP of the refrigerating machine oil may be, for example, 450° C. or lower, 440° C. or lower, 430° C. or lower, or 425° C. or lower, from the viewpoint of further lowering the viscosity.

Regarding other distillation properties by gas chromatography distillation of the refrigerating machine oil, it is preferable to maintain the distillation temperature on the high boiling point side in an appropriate range while increasing the distillation temperature on the low boiling point side, from the viewpoint of achieving a more excellent balance between the low-viscosity and the lubricity of the refrigerating machine oil and maintaining a high flash point. Such a refrigerating machine oil desirably has distillation properties described below.

The initial boiling point IBP of the refrigerating machine oil may be, for example, 180° C. or higher, 200° C. or higher, 210° C. or higher, 220° C. or higher, or 225° C. or higher, and may be, for example, 260° C. or lower, 250° C. or lower, or 240° C. or lower.

The 5% distillation temperature $T_5$ of the refrigerating machine oil may be, for example, 190° C. or higher, 205° C. or higher, 215° C. or higher, 225° C. or higher, or 235° C. or higher, and may be, for example, 265° C. or lower, 255° C. or lower, or 245° C. or lower.

The 10% distillation temperature $T_{10}$ of the refrigerating machine oil may be, for example, 200° C. or higher, 210° C. or higher, 220° C. or higher, 230° C. or higher, or 240° C. or higher, and may be, for example, 270° C. or lower, 260° C. or lower, or 250° C. or lower.

The 50% distillation temperature $T_{50}$ of the refrigerating machine oil may be, for example, 220° C. or higher, 230° C. or higher, 240° C. or higher, 250° C. or higher, or 260° C. or higher, and may be, for example, 310° C. or lower, 300° C. or lower, or 280° C. or lower.

The 70% distillation temperature $T_{70}$ of the refrigerating machine oil may be, for example, 240° C. or higher, 250° C. or higher, 260° C. or higher, 270° C. or higher, or 280° C. or higher, from the viewpoint of lubricity and a high flashpoint. The 70% distillation temperature $T_{70}$ of the refrigerating machine oil may be, for example, 340° C. or lower, 330° C. or lower, or 300° C. or lower, from the viewpoint of reducing the viscosity.

The 90% distillation temperature $T_{90}$ of the refrigerating machine oil may be, for example, 250° C. or higher, 270° C. or higher, 280° C. or higher, 290° C. or higher, or 300° C. or higher, and is particularly preferably 320° C. or higher, 330° C. or higher, or 340° C. or higher, from the viewpoint of further excellent antiwear property. The 90% distillation temperature $T_{90}$ of the refrigerating machine oil may be, for example, 400° C. or lower, 370° C. or lower, 360° C. or lower, or 355° C. or lower, from the same viewpoint as described above.

The 95% distillation temperature $T_{95}$ of the refrigerating machine oil may be, for example, 270° C. or higher, 280° C. or higher, 290° C. or higher, 300° C. or higher, 310° C. or higher, or 330° C. or higher, and is particularly preferably 340° C. or higher, 350° C. or higher, or 360° C. or higher, from the viewpoint of further excellent antiwear property. The 95% distillation temperature $T_{95}$ of the refrigerating machine oil may be, for example, 410° C. or less, 400° C. or less, 390° C. or less, or 380° C. or less.

As described above, the distillation temperature on the high boiling point side is preferably maintained in an appropriate range while the distillation temperature on the low boiling point side is increased, from the viewpoint of achieving a more excellent balance between the low-viscosity and the lubricity of the refrigerating machine oil and maintaining a high flash point. In addition to the above, rather than widening the distillation range, it is desirable to maintain it within a reasonably narrow range and not too narrow, as described below.

The difference between the 5% distillation temperature $T_5$ and the 90% distillation temperature $T_{99}$ ($T_{90}$-$T_5$) of the refrigerating machine oil may be, for example, 40° C. or more, 50° C. or more, or 60° C. or more, particularly preferably 80° C. or more, or 100° C. or more, and may be, for example, 200° C. or less, 160° C. or less, 150° C. or less, 140° C. or less, or 130° C. or less.

The difference between the initial boiling point IBP and the 90% distillation temperature $T_{90}$ ($T_{90}$-IBP) of the refrigerating machine oil may be, for example, 40° C. or more, 50° C. or more, 60° C. or more, or 70° C. or more, particularly preferably 80° C. or more, or 100° C. or more, and may be, for example, 170° C. or less, 160° C. or less, 150° C. or less, or 140° C. or less.

The difference between the initial boiling point IBP and the 95% distillation temperature $T_{95}$ ($T_{95}$-IBP) of the refrigerating machine oil may be, for example, 50° C. or more, 60° C. or more, 70° C. or more, or 80° C. or more, particularly preferably 100° C. or more, or 120° C. or more, and may be, for example, 180° C. or less, 170° C. or less, 160° C. or less, or 150° C. or less.

The difference between the 90% distillation temperature $T_{90}$ and the 95% distillation temperature $T_{95}$ ($T_{95}$-$T_{90}$) of the refrigerating machine oil may be, for example, 1° C. or more, 3° C. or more, 5° C. or more, 10° C. or more, or 20° C. or more, and may be, for example, 100° C. or less, 80° C. or less, 50° C. or less, or 40° C. or less, from the viewpoint of lubricity.

The difference between the 90% distillation temperature $T_{90}$ of the refrigerating machine oil and the distillation end point EP (EP-$T_{90}$) may be, for example, 30° C. or more, 50° C. or more, 60° C. or more, or 70° C. or more, and may be, for example, 150° C. or less, 140° C. or less, 130° C. or less, or 120° C. or less, particularly preferably 100° C. or less, 90° C. or less, or 80° C. or less.

The initial boiling point, the 5% distillation temperature, the 10% distillation temperature, the 50% distillation temperature, the 70% distillation temperature, the 90% distillation temperature and the distillation end point in the present invention mean the initial boiling point, the 5% (by volume) distillation temperature, the 10% (by volume) distillation temperature, the 50% (by volume) distillation temperature, the 70% (by volume) distillation temperature, the 90% (by volume) distillation temperature, the 95% (by volume) distillation temperature and the distillation end point, measured by the gas chromatography distillation test method defined in ASTM D 7213-05, respectively.

The sulfur content of the refrigerating machine oil is 0.001% by mass or more and 0.2% by mass or less. The sulfur content of the refrigerating machine oil may be, for example, 0.003% by mass or more, or 0.005% by mass or more, and may be, for example, 0.3% by mass or less, 0.1% by mass or less, or 0.05% by mass or less, from the viewpoint of further excellent antiwear property. The sulfur content in the present invention means a sulfur content measured by an ultraviolet fluorescence method defined in JIS K 2541-6:2013.

The composition ratio of the refrigerating machine oil according to the ring analysis is preferably maintained in the following range from the viewpoint of achieving a more excellent balance between the low-viscosity and the lubricity of the refrigerating machine oil and maintaining a high flash point.

The % $C_P$ of the refrigerating machine oil may be, for example, 15 or more, 40 or more, or 50 or more, and may be, for example, 70 or less, 60 or less, or 55 or less.

The % $C_N$ of the refrigerating machine oil may be, for example, 30 or more, 35 or more, or 40 or more, and may be, for example, 85 or less, 70 or less, 60 or less, 50 or less, or 49 or less.

The ratio of % $C_N$ to % C of the refrigerating machine oil (% $C_N$/% $C_P$) may be, for example, 0.5 or more, 0.6 or more, or 0.7 or more, and may be, for example, 4.5 or less, 2.0 or less, 1.4 or less, 1.3 or less, or 1.2 or less.

The % $C_A$ of the refrigerating machine oil may be, for example, 8 or less, 5 or less, or 3 or less, and may be 0, but may be 0.5 or more, or 1 or more, from the viewpoint of lubricity and stability.

The % $C_P$, % $C_N$ and % $C_A$ in the present invention each mean values measured by methods (n-d-M ring analysis) in accordance with ASTM D 3238-95 (2010).

The flash point of the refrigerating machine oil may be, for example, 100° C. or higher, 110° C. or higher, or 120° C. or higher, from the viewpoint of safety, and may be, for example, 155° C. or lower, or 145° C. or lower, from the viewpoint of obtaining a low-viscosity oil. The flash point in the present invention means flash point measured in accordance with JIS K 2265-4:2007 (Cleveland open cup (COC) method).

The pour point of the refrigerating machine oil may be, for example, −10° C. or lower, −20° C. or lower, or −50° C. or lower, but may be −40° C. or higher from the viewpoint of purification cost. The pour point in the present invention means pour point measured in accordance with JIS K 2269:1987.

The acid value of the refrigerating machine oil may be, for example, 1.0 mgKOH/g or less, or 0.1 mgKOH/g or less. The acid value in the present invention means acid value measured in accordance with JIS K 2501:2003.

The volume resistivity of the refrigerating machine oil may be, for example, $1.0 \times 10^9$ Ω·m or more, $1.0 \times 10^{10}$ Ω·m or more, or $1.0 \times 10^{11}$ Ω·m or more. The volume resistivity in the present invention means volume resistivity at 25° C. measured in accordance with JIS C 2101:1999.

The moisture content of the refrigerating machine oil may be, for example, 200 ppm or less, 100 ppm or less, or 50 ppm or less, based on the total amount of the refrigerating machine oil.

The ash content of the refrigerating machine oil may be, for example, 100 ppm or less, or 50 ppm or less. The ash content in the present invention means ash content measured in accordance with JIS K 2272:1998.

In order to produce a refrigerating machine oil having the above-described properties, the properties of the lubricating base oil as a main component (for example, 90% by mass or more) are preferably the same as those described above unless otherwise specified in the present specification. Therefore, although the ranges of the properties of the respective items of the refrigerating machine oil have been described above, the ranges may be read as the ranges of the respective items of the lubricating base oil contained in the refrigerating machine oil unless otherwise specified in the present specification. For example, the distillation properties of the lubricating base oil by GC distillation are not particularly limited as long as the distillation properties of the refrigerating machine oil fall within the above-described range. The definition from the initial boiling point MP to the 90% distillation temperature $T_{90}$ of the lubricating base oil and the definition related thereto are not easily affected by the blending of the additives, and therefore may be read as, for example, substantially the same as or within ±5° C. of the distillation properties of the refrigerating machine oil. The distillation end point EP of the lubricating base oil may be, for example, 450° C. or less, and the 95% distillation temperature $T_{95}$ may be, for example, 410° C. or less.

The refrigerating machine oil according to the present embodiment is usually present in a state of being mixed with a refrigerant to be a working fluid composition for a refrigerating machine, in the refrigerating machine. That is, the working fluid composition for a refrigerating machine according to the present embodiment contains the refrigerating machine oil and the refrigerant. The content of the refrigerating machine oil in the working fluid composition for a refrigerating machine may be 1 to 500 parts by mass or 2 to 400 parts by mass based on 100 parts by mass of the refrigerant.

Examples of the refrigerant include hydrocarbon refrigerants, saturated hydrofluorocarbon refrigerants, unsaturated hydrofluorocarbon refrigerants, fluorine-containing ether refrigerants such as perfluoroethers, bis-(trifluoromethyl) sulfide refrigerants, difluoroiodomethane refrigerants, and natural refrigerants such as ammonia and carbon dioxide.

The hydrocarbon refrigerant is preferably a hydrocarbon having 1 to 5 carbon atoms, more preferably a hydrocarbon having 2 to 4 carbon atoms. Specific examples of the hydrocarbon include methane, ethylene, ethane, propylene, propane (R290), cyclopropane, n-butane, isobutane (R600a), cyclobutane, methylcyclopropane, 2-methylbutane, n-pentane, and a mixture of two or more thereof. Among these, the hydrocarbon refrigerant is preferably a hydrocarbon refrigerant that is gaseous at 25° C. and 1 atm., and is more preferably propane, n-butane, isobutane, 2-methylbutane, or a mixture thereof.

The saturated hydrofluorocarbon refrigerant is preferably a saturated hydrofluorocarbon having 1 to 3 carbon atoms, more preferably 1 to 2 carbon atoms. Specific examples of the saturated hydrofluorocarbon refrigerant include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or a mixture of 2 or more thereof.

The saturated hydrofluorocarbon refrigerant is appropriately selected from the above-mentioned refrigerants according to the use and required performance. The saturated hydrofluorocarbon refrigerant is, for example, R32 alone; R23 alone; R134a alone; R125 alone; a mixture of R134a/R32=60 to 80% by mass/40 to 20% by mass; a mixture of R32/R125=40 to 70% by mass/60 to 30% by mass; a mixture of R125/R143a=40 to 60% by mass/60 to 40% by mass; a mixture of R134a/R32/R125=60% by mass/30% by mass/10% by mass; a mixture of R134a/R32/R125=40 to 70% by mass/15 to 35% by mass/5 to 40% by mass; and a mixture of R125/R134a/R143a=35 to 55% by mass/1 to 15% by mass/40 to 60% by mass. More specifically, the saturated hydrofluorocarbon refrigerant may be a mixture of R1.34a/R32=70/30% by mass; R32/R125=60/40% by mass; R32/R125=50/50% by mass (R410A); R32/R125=45/55% by mass (R410B); R125/R143a=50/50% by mass (R507C); R32/R125/R134a=30/10/60% by mass; R32/R125/R134a=23/25/52% by mass (R407C); and R32/R125/R134a=25/15/60% by mass (R407E), R125/R134a/R143a=44/4/52% by mass (R404A).

The unsaturated hydrofluorocarbon (HFO) refrigerant is preferably an unsaturated hydrofluorocarbon having 2 to 3 carbon atoms, more preferably fluoropropene, and still more preferably fluoropropene having 3 to 5 fluorine atoms. The unsaturated hydrofluorocarbon refrigerant is preferably any one of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf), or a mixture of two or more of these. The unsaturated hydrofluorocarbon refrigerant is preferably one or two or more selected from HFO-1225ye, HFO-1234ze and HFO-1234yf, from the viewpoint of refrigerant physical properties. The unsaturated hydrofluorocarbon refrigerant may be fluoroethylene, and is preferably 1,1,2,3-trifluoroethylene.

Among these refrigerants, a refrigerant having a low global warming potential (GWP) is preferable in order to reduce the influence on the global environment. Examples of such a refrigerant include a mixed refrigerant having a GWP of 1000 or less and containing at least one selected from the unsaturated hydrofluorocarbon refrigerants and natural refrigerants such as 8290 and R600a. The GWP of these refrigerants may be 500 or less, 100 or less, 50 or less, or 10 or less.

The boiling point of these refrigerants is preferably, for example, 0° C. or lower and −60° C. or higher from the viewpoint of cooling capacity. Above all, it is more preferably −30° C. or lower from the viewpoint of a low compression ratio and a high volumetric capacity, and it is more preferably −30° C. or higher from the viewpoint of a low pressure and a small sliding loss of the compressor. Examples of the refrigerant having a low compression ratio and a high volumetric capacity include R290 (boiling point: −42.1° C.), and examples of the refrigerant having a low pressure and a small sliding loss of the compressors include R600a (boiling point: −11.6° C.). It is particularly preferable to use R600a from the viewpoint of expecting the effect of improving the efficiency of the refrigerating machine by reducing the sliding loss of the compressors in combination with the lowering of the viscosity of the refrigerating machine oil.

The refrigerating machine oil and the working fluid composition for a refrigerating machine according to the present embodiment are suitably used for a refrigerating machine such as an air conditioner having a reciprocating or rotary hermetic compressor, a refrigerating machine, an open or hermetic car air conditioner, a dehumidifier, a water heater, a freezer, a freezing and refrigerating warehouse, an automatic vending machine, a showcase, or a chemical plant, a refrigerating machine having a centrifugal compressor, or the like.

FIG. 1 is a schematic view showing an example of the configuration of a refrigerating machine to which the refrigerating machine oil and the working fluid composition for a refrigerating machine according to the present embodiment are applied. As shown in FIG. 1, the refrigerating machine 10 includes at least a refrigerant circulation system in which, for example, a refrigerant compressor 1, a gas cooler 2, an expansion mechanism 3 (a capillary, an expansion valve, or the like), and an evaporator 4 are sequentially connected by a flow path 5. In such a refrigerant circulation system, first, a high-temperature (usually 70 to 120° C.) refrigerant discharged from the refrigerant compressor 1 into the flow path 5 becomes a high-density fluid (supercritical fluid or the like) in the gas cooler 2. Subsequently, the refrigerant is liquefied by passing through a narrow flow path of the expansion mechanism 3, and is further vaporized in the evaporator 4 to have a low temperature (usually −40 to 0° C.).

In the refrigerant compressor 1 in FIG. 1, a small amount of refrigerant and a large amount of refrigerating machine oil coexist under high temperature conditions (usually 70 to 120° C.). The refrigerant discharged from the refrigerant compressor 1 to the flow path 5 is in a gaseous state and contains a small amount (usually 1 to 10%) of the refrigeration machine oil as a mist, and a small amount of the refrigerant is dissolved in the mist-like refrigeration machine oil (point a in FIG. 1). Next, in the gas cooler 2, the gaseous refrigerant is compressed into a high-density fluid, and a large amount of refrigerant and a small amount of refrigerating machine oil coexist under relatively high temperature conditions (around 50 to 70° C.) (point b in FIG. 1). Further, the mixture of a large amount of refrigerant and a small amount of refrigerating machine oil is sent to the expansion mechanism 3 and the evaporator 4 in this order to rapidly reach a low temperature (usually −40 to 0° C.) (points c and d in FIG. 1), and is returned to the refrigerant compressor 1 again.

The refrigerating machine oil according to the present embodiment can be used together with the above-described refrigerant, but is particularly suitably used together with a hydrocarbon refrigerant in terms of the cooling temperature characteristics and compatibility at the time of refrigerant mixing. From the same viewpoint, the working fluid composition for a refrigerating machine particularly preferably contains a hydrocarbon refrigerant.

EXAMPLES

Hereinafter, the present invention will be described more specifically based on Examples, but the present invention is not limited to Examples.

As lubricating base oils, commercially available base oils 1 to 5 having properties shown in Table 1 were prepared.

[Additive]
(Compound Represented by Formula (1))
A: compound represented by the following formula (A-1)

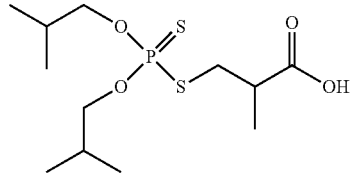

(A-1)

(First Extreme Pressure Agent)
B: triphenyl phosphorothionate
(Second Extreme Pressure Agent)
C: tricresyl phosphate
(Antiwear Property Test)

Each of the refrigerating machine oils of Examples and Comparative Examples was used as a test oil, and the antiwear property was evaluated by the following procedure. The results are shown in Tables 2 and 3.

The antiwear property test was performed by a high speed four balls test according to ASTM D 4172-94. SUJ2 was used as the rigid sphere, and the test was performed under the conditions of a test oil amount of 20 nil, a test temperature of 80° C., a rotation speed of 1200 rpm, a load of 196 N, and a test time of 15 minutes. The antiwear property was evaluated by using an average value of wear scar diameters (mm) of the fixed balls. The surface pressure at this time was about 2.3 GPa, and the peripheral speed was calculated to be about 36 cm/s. When the average value of the wear scar diameter under this condition is 0.7 mm or less, it can be said that the refrigerating machine oil has high antiwear property even under severe lubricating conditions such as mixed lubricating conditions or boundary lubricating conditions. The average wear scar diameter is preferably 0.5 mm or less, more preferably 0.45 mm or less, and still more preferably 0.4 mm or less.

As shown in Tables 2 and 3, the refrigerating machine oils of Examples 1 to 4 according to the present invention were excellent in antiwear property. The refrigerating machine

TABLE 1

| | | Base oil 1 | Base oil 2 | Base oil 3 | Base oil 4 | Base oil 5 |
|---|---|---|---|---|---|---|
| Kinematic viscosity at 100° C. | mm²/s | 1.0 | 1.3 | 2.2 | 1.2 | 2.2 |
| Kinematic viscosity at 40° C. | mm²/s | 2.3 | 3.3 | 7.5 | 2.9 | 8.1 |
| Acid value | mgKOH/g | <0.01 | <0.01 | <0.01 | <0.01 | <0.01 |
| Pour point | ° C. | −25 | −37.5 | <−40 | <−40 | −32.5 |
| Content of sulfur | % by mass | <0.001 | <0.001 | <0.001 | 0.007 | 0.025 |
| Flash point COC | ° C. | 108 | 130 | 160 | 106 | 166 |
| n-d-M ring analysis | % $C_A$ | 4.2 | 1.8 | 0 | 0.5 | 8.6 |
| | % $C_P$ | 59.1 | 44.9 | 60.5 | 18.4 | 54.2 |
| | % $C_N$ | 36.7 | 53.3 | 39.5 | 81.1 | 37.2 |
| | % $C_N$/% $C_P$ | 0.6 | 1.2 | 0.7 | 4.4 | 0.7 |

Refrigerating machine oils (Examples 1 to 4 and Comparative Examples 1 to 2) having compositions and properties shown in Tables 2 and 3 were prepared using base oils 1 to 5 and additives shown below. In the tables, a plurality of base oil numbers (for example, "base oil 1, 2, 5" in Example 1) means that a mixed base oil prepared by mixing base oils was used.

oils of Examples 2 and 3 were more excellent in antiwear property by using the additive A in combination with the additives B and/or C as compared with the case where only the additives B and/or C were used. Specifically, the refrigerating machine oil of Example 2 was found to have an effect of improving antiwear property by about 20% as compared with a refrigerating machine oil having the same composition as that of Example 2 except that the additive A was not used. Further, the refrigerating machine oil of Example 3 was found to have an effect of improving antiwear property by about 8% as compared with a refrigerating machine oil having the same composition as that of Example 3 except that the additive A was not used.

In addition, two refrigerating machine oils were obtained in the same manner as in Example 1 except that the content of (A-1) in the refrigerating machine oil of Example 1 was changed to 0.05% by mass or 0.1% by mass. The kinematic viscosity at 100° C. of these refrigerating machine oils was 0.5 mm$^2$/s or more and 2.5 mm$^2$/s or less. These refrigerating machine oils were found to have the same effect of improving antiwear property as in Example 1, but it was suggested that stability tends to deteriorate as the content increases.

Further, one refrigerating machine oil was obtained in the same manner as in Example 1 except that the following formula (A-2) was used instead of (A-1) as the additive A in the refrigerating machine oil of Example 1. The kinematic viscosity of the refrigerating machine oil at 100° C. was 0.5 mm$^2$/s or more and 2.5 mm$^2$/s or less. This refrigerating machine oil was also found to have the same effect of improving antiwear property as the refrigerating machine oil of Example 1, but it was suggested that the improvement effect per addition amount tended to be slightly small.

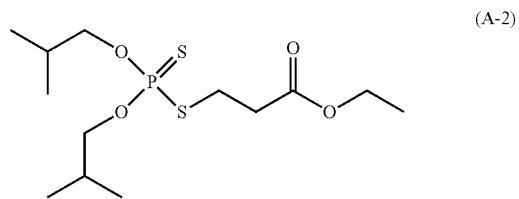 [SMILES: CCOC(=O)CCSP(=S)(OCC(C)C)OCC(C)C]

(A-2)

Further, six refrigerating machine oils were obtained in the same manner as in Example 2 or 3 except that triphenyl phosphate, tri (propylphenyl) phosphate or tri (butylphenyl) phosphate was used as the additive C in the refrigerating machine oil of Example 2 or 3 instead of tricresyl phosphate. The kinematic viscosity of the refrigerating machine oil at 100° C. was 0.5 mm$^2$/s or more and 2.5 mm$^2$/s or less. These refrigerating machine oils were also found to have the same effect of improving antiwear property as the refrigerating machine oils of Examples 2 and 3.

The same refrigerating machine oil as in Example 1 was obtained except that the base oil 5 was used as the base oil of the refrigerating machine oil of Example 1. The kinematic viscosity of the refrigerating machine oil at 100° C. was 0.5 mm$^2$/s or more and 2.5 mm$^2$/s or less. The same effect of improving antiwear property as that of the refrigerating machine oil of Example 1 was also found in the refrigerating machine oil, but it was suggested that the improvement effect per addition amount tended to be slightly small.

TABLE 2

|  |  |  | Example 1 | Example 2 | Example 3 | Example 4 |
|---|---|---|---|---|---|---|
|  |  |  | Base oil | | | |
|  |  |  | Base oil 1, 2, 5 | Base oil 1, 2, 5 | Base oil 1, 2, 5 | Base oil 4 |
| Composition of refrigerating machine oil | Base oil | % by mass | Balance | Balance | Balance | Balance |
|  | A |  | 0.01 | 0.01 | 0.01 | 0.01 |
|  | B |  | — | — | 0.2 | — |
|  | C |  | — | 1.5 | 1.5 | — |
| Kinematic viscosity at 100° C. |  | mm$^2$/s | 1.3 | 1.3 | 1.3 | 1.3 |
| Kinematic viscosity at 40° C. |  |  | 3.4 | 3.4 | 3.4 | 3 |
| Flash point COC |  | ° C. | 131 | 131 | 131 | 106 |
| Pour point |  |  | −35 | −35 | −35 | −40 |
| Aniline point |  |  | 80 | 80 | 80 | 60 |
| Distillation properties by gas chromatography | IBP |  | 230 | 230 | 230 | 189 |
|  | $T_5$ |  | 240 | 240 | 240 | 204 |
|  | $T_{10}$ |  | 246 | 246 | 246 | 210 |
|  | $T_{50}$ |  | 274 | 274 | 274 | 240 |
|  | $T_{70}$ |  | 292 | 292 | 292 | 253 |
|  | $T_{90}$ |  | 350 | 350 | 350 | 268 |
|  | $T_{95}$ |  | 377 | 378 | 378 | 275 |
|  | EP |  | 422 | 424 | 424 | 312 |
|  | $T_{90}$-$T_5$ |  | 110 | 110 | 110 | 64 |
|  | $T_{90}$-IBP |  | 120 | 120 | 120 | 79 |
|  | $T_{95}$-IBP |  | 147 | 148 | 148 | 86 |
|  | $T_{95}$-$T_{90}$ |  | 27 | 28 | 28 | 7 |
|  | EP-$T_{90}$ |  | 72 | 74 | 74 | 44 |
| Content of sulfur | Total | % by mass | 0.008 | 0.008 | 0.027 | 0.009 |
|  | Base oil |  | 0.006 | 0.006 | 0.006 | 0.007 |
| n-d-M ring analysis |  | % $C_A$ | 4.3 | 4.3 | 4.3 | 0.5 |
|  |  | % $C_P$ | 52.6 | 52.6 | 52.6 | 18.4 |
|  |  | % $C_N$ | 43.1 | 43.1 | 43.1 | 81.1 |
|  |  | % $C_N$/% $C_P$ | 0.8 | 0.8 | 0.8 | 4.4 |
| Antiwear property (wear scar diameter) |  | WSD, mm | 0.41 | 0.37 | 0.365 | 0.5 |

TABLE 3

|  |  |  | Comparative Example 1 | Comparative Example 2 |
|---|---|---|---|---|
| Base oil Composition of refrigerating machine oil | Base oil A | % by mass | Base oil 2 Balance — | Base oil 1, 2, 3 Balance — |
|  | B |  | — | — |
|  | C |  | 1.7 | 1.7 |
| Kinematic viscosity at 100° C. |  | mm/s | 1.3 | 1.2 |
| Kinematic viscosity at 40° C. |  |  | 3.3 | 3.1 |
| Flash point COC |  | ° C. | 130 | 126 |
| Pour point |  |  | −40 | −30 |
| Aniline point |  |  | 78 | 83 |
| Distillation properties by gas chromatograph | IBP |  | 229 | 233 |
|  | $T_5$ |  | 246 | 240 |
|  | $T_{10}$ |  | 252 | 243 |
|  | $T_{50}$ |  | 275 | 264 |
|  | $T_{70}$ |  | 285 | 276 |
|  | $T_{90}$ |  | 295 | 314 |
|  | $T_{95}$ |  | 300 | 347 |
|  | EP |  | 410 | 406 |
|  | $T_{90} - T_5$ |  | 49 | 74 |
|  | $T_{90} - IBP$ |  | 67 | 81 |
|  | $T_{95} - IBP$ |  | 71 | 114 |
|  | $T_{95} - T_{90}$ |  | 4 | 33 |
|  | $Ep - T_{90}$ |  | 115 | 92 |
| Content of sulfur | Total | % by mass | <0.0001 | <0.0001 |
|  | Base oil |  | <0.0001 | <0.0001 |
| n-d-M ring analysis | % $C_A$ |  | 1.8 | 1.9 |
|  | % $C_P$ |  | 44.9 | 50.2 |
|  | % $C_N$ |  | 53.3 | 47.9 |
|  | % $C_N$/% $C_P$ |  | 1.2 | 1 |
| Antiwear propery (wear scar diameter) |  | WSD, mm | 1.012 | 1.053 |

(Two Layer Separation Temperature During Mixing of Hydrocarbon Refrigerant)

With respect to the refrigerating machine oil used in these examples, the two layer separation temperature was measured in accordance with HS K2211:2009, Appendix D, "Testing method for compatibility with refrigerant", using isobutane (R600a) as the refrigerant and setting the test oil concentration to 10% by mass. The two layer separation temperature at this time was −50° C. or lower, and it was confirmed that the refrigerating machine oil used in these examples could be used as a refrigerating machine oil for a hydrocarbon refrigerant.

REFERENCE SIGNS LIST

1: refrigerant compressor, 2: gas cooler, 3: expansion mechanism 4: evaporator, 5: channel, 10: refrigerating machine.

The invention claimed is:
1. A refrigerating machine oil comprising:
a lubricating base oil;
a compound represented by the following formula (1):

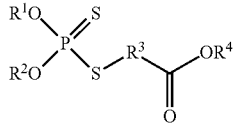

wherein $R^1$ and $R^2$ each independently represent an alkyl group having 1 to 10 carbon atoms, $R^3$ represents an alkylene group having 1 to 10 carbon atoms, and $R^4$ represents hydrogen atom or an alkyl group having 1 to 10 carbon atoms, and a sulfur-free phosphoric ester selected from the group consisting of tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, tri-(ethylphenyl) phosphate, tri-(propylphenyl) phosphate, tri-(butylphenyl) phosphate, trixylenyl phosphate, cresyldiphenyl phosphate, and xylenyldiphenyl phosphate, wherein a content of the lubricating base oil is 90% by mass or more, a content of the compound represented by the formula (1) is 0.001 to 0.1% by mass, and a content of the sulfur-free phosphoric ester is 0.1 to 5% by mass, based on a total amount of the refrigerating machine oil, the refrigerating machine oil having a kinematic viscosity at 100° C. of 0.5 mm²/s or more and 2.5 mm²/s or less.

2. The refrigerating machine oil according to claim 1, wherein the refrigerating machine oil has a 90% distillation temperature by gas chromatography distillation of 250° C. or more and 400° C. or less.

3. The refrigerating machine oil according to claim 1, wherein the refrigerating machine oil has a 95% distillation temperature by gas chromatography distillation of 270° C. or more and 410° C. or less.

4. The refrigerating machine oil according to claim 1, wherein the refrigerating machine oil has a difference between a 90% distillation temperature and a 5% distillation temperature by gas chromatography distillation of 40° C. or more and 200° C. or less.

5. The refrigerating machine oil according to claim 1, wherein the refrigerating machine oil has a % $C_A$ by n-d-M ring analysis of 5 or less.

6. The refrigerating machine oil according to claim 1, wherein a sulfur content of the lubricating base oil is 0.001% by mass or more and 0.2% by mass or less.

7. A working fluid composition comprising:
a refrigerating machine oil; and
a refrigerant selected from the group consisting of a hydrocarbon refrigerant and a natural refrigerant, wherein no other refrigerant is contained in the working fluid composition;
wherein the refrigerating machine oil comprises
a lubricating base oil and
a compound represented by the following formula (1):

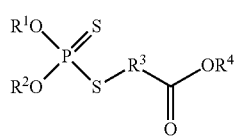

wherein $R^1$ and $R^2$ each independently represent a monovalent hydrocarbon group, $R^3$ represents a divalent hydrocarbon group, and $R^4$ represents hydrogen atom or a monovalent hydrocarbon group, and the refrigerating machine oil has a kinematic viscosity at 100° C. of 0.5 mm²/s or more and 2.5 mm²/s or less.

8. The working fluid composition according to claim 7, wherein the refrigerating machine oil has a 90% distillation temperature by gas chromatography distillation of 250° C. or more and 400° C. or less.

9. The working fluid composition according to claim 7, wherein the refrigerating machine oil has a 95% distillation temperature by gas chromatography distillation of 270° C. or more and 410° C. or less.

10. The working fluid composition according to claim 7, wherein the refrigerating machine oil has a difference between a 90% distillation temperature and a 5% distillation temperature by gas chromatography distillation of 40° C. or more and 200° C. or less.

11. The working fluid composition according to claim 7, wherein the refrigerating machine oil has a % $C_A$ by n-d-M ring analysis of 5 or less.

12. The working fluid composition according to claim 7, wherein a sulfur content of the lubricating base oil is 0.001% by mass or more and 0.2% by mass or less.

* * * * *